United States Patent
Xie

(10) Patent No.: US 9,891,468 B2
(45) Date of Patent: Feb. 13, 2018

(54) REFLECTIVE LIQUID CRYSTAL DISPLAY PANEL AND DISPLAY DEVICE

(71) Applicant: Wuhan China Star Optoelectronics Technology Co., Ltd., Wuhan, Hubei (CN)

(72) Inventor: Chang Xie, Guangdong (CN)

(73) Assignee: Wuhan China Star Optoelectronics Technology Co., Ltd., Wuhan, Hubei (CN)

(*) Notice: Subject to any disclaimer, the term of this patent is extended or adjusted under 35 U.S.C. 154(b) by 242 days.

(21) Appl. No.: 14/898,841

(22) PCT Filed: Dec. 3, 2015

(86) PCT No.: PCT/CN2015/096265
§ 371 (c)(1),
(2) Date: Dec. 16, 2015

(87) PCT Pub. No.: WO2017/088203
PCT Pub. Date: Jun. 1, 2017

(65) Prior Publication Data
US 2017/0192298 A1    Jul. 6, 2017

(51) Int. Cl.
*G02F 1/1335* (2006.01)
*G02F 1/1343* (2006.01)
*G02F 1/1368* (2006.01)

(52) U.S. Cl.
CPC ...... *G02F 1/133553* (2013.01); *G02F 1/1368* (2013.01); *G02F 1/13439* (2013.01); *G02F 1/133504* (2013.01); *G02F 1/133514* (2013.01); *G02F 2201/121* (2013.01); *G02F 2201/123* (2013.01); *G02F 2201/34* (2013.01); *G02F 2203/03* (2013.01)

(58) Field of Classification Search
CPC ......... G02F 1/133553; G02F 1/133555; G02F 1/133504
See application file for complete search history.

(56) References Cited

U.S. PATENT DOCUMENTS

2013/0229603 A1*   9/2013   Tamaki ............ G02F 1/133504
                                                                349/113
2014/0024154 A1*   1/2014   Aihara ............. G02F 1/133553
                                                                438/27

* cited by examiner

*Primary Examiner* — Phu Vu
(74) *Attorney, Agent, or Firm* — Andrew C. Cheng

(57) ABSTRACT

A reflective LCD panel includes a first and second substrates spaced apart from each other, a liquid crystal layer disposed between the first and second substrates, a common electrode layer disposed on the side of the first substrate facing the liquid crystal layer, a scattering layer disposed on the side of the common electrode layer facing the liquid crystal layer, a specular reflector disposed on the side of the second substrate facing the liquid crystal layer. The present invention also proposes a display device. Through this arrangement, the light inputted from the first substrate and common electrode layer scatters when passing through the scattering layer, and produces specular reflection when it further inputted into the specular reflector through the liquid crystal layer. The present invention delivers diffuse reflection effect through the scattering layer and specular reflector, effectively lowering the production cost.

20 Claims, 1 Drawing Sheet

REFLECTIVE LIQUID CRYSTAL DISPLAY PANEL AND DISPLAY DEVICE

BACKGROUND OF THE INVENTION

1. Field of the Invention

The present invention relates to liquid crystal technology, and more specifically to a reflective liquid crystal display (LCD) panel and display device comprises the reflective LCD panel.

2. Description of the Prior Art

Current display device comprise transmissive display device, reflective display device and transflective display device. Transflective display device mainly adopts backlight as its light source, meaning that a backlight source must be put in place on the back of the display panel of a transflective display device as a light source. However, the utilization rate of the backlight source is not high. The brightness of the backlight source must be greatly elevated in order to improve the display brightness, therefore the energy consumption is high.

A reflective display device, on the other hand, adopts a frontlight source as its light source, meaning that no backlight source is needed on the back of the display panel of a reflective display device. It mainly adopts external light source as a light source for its display panel, which consumes less energy. As shown in FIG. 1, the display panel of a reflective display device usually comprises a color filter array substrate 10 and a thin-film transistor (TFT) array substrate 11, facing each other. A liquid crystal layer 13 is sealed in the space between the two substrates, and a reflective layer 12 is disposed on top of the TFT array substrate 11. In order to provide an even reflective effect on every viewing angle for viewers, the reflective layer 12 must be diffuse reflective, which is realized through a microstructure with an uneven surface. More specifically, the reflective layer 12 comprises an uneven metal layer 121 and an uneven resin layer 122.

However, during the production process, a base of resin layer 122 must be formed in the reflective area before undertaking exposure, development and etching, so that the base of resin layer 122 forms an uneven surface, which requires one more exposure. Lastly, sputter metal on the uneven surface of the base of resin layer 122 to form a metal layer 121, thus forming a reflective layer with uneven surface. In other words, when producing a microstructure of uneven surface with conventional technology, an additional step of exposure must be taken, leading to extra production cost.

To sum up, it is necessary to provide a reflective liquid crystal display (LCD) panel and a display device comprising the LCD panel to solve the existing problem.

SUMMARY OF THE INVENTION

An object of the present invention is mainly to provide a reflective LCD panel and display device that lowers the production cost.

According the present invention, a reflective liquid crystal display (LCD) panel comprises: a first substrate and a second substrate, spaced apart from each other; a liquid crystal layer, disposed between the first and second substrates; a common electrode layer, disposed on the side of the first substrate facing the liquid crystal layer; a scattering layer, being a transparent film added with scattering particles and disposed on the side of the common electrode layer facing the liquid crystal layer; a specular reflector, being a metal layer and disposed on the side of the second substrate facing the liquid crystal layer. The light inputted through the first substrate and the common electrode layer scatters when passing through the scattering layer, and the scattered light inputs into the specular reflector through the liquid crystal layer and produces specular reflection.

Furthermore, the metal layer serves as the pixel electrode layer of the reflective LCD panel.

Furthermore, materials for the metal layer are silver or aluminum.

Furthermore, materials for the transparent film are resin, polyethylene or polyvinyl chloride (PVC).

According to the present invention, a reflective liquid crystal display (LCD) panel comprises: a first substrate and a second substrate, spaced apart from each other; a liquid crystal layer, disposed between the first and second substrates; a common electrode layer, disposed on the side of the first substrate facing the liquid crystal layer; a scattering layer, disposed on the side of the common electrode layer facing the liquid crystal layer; a specular reflector, disposed on the side of the second substrate facing the liquid crystal layer. The light inputted through the first substrate and the common electrode layer scatters when passing through the scattering layer, and the scattered light inputs into the specular reflector through the liquid crystal layer and produces specular reflection.

Furthermore, the specular reflector is a metal layer.

Furthermore, the metal layer serves as the pixel electrode layer of the reflective LCD panel.

Furthermore, materials for the metal layer are silver or aluminum.

Furthermore, the scattering layer is a transparent film added with scattering particles.

Furthermore, materials for the transparent film are resin, polyethylene or polyvinyl chloride (PVC).

Furthermore, the reflective LCD panel further comprises a color film polarizer disposed on a side of the first substrate opposite to the liquid crystal layer.

Furthermore, the first substrate is a color filter array substrate, and the second substrate is a thin film transistor array substrate.

According to the present invention, a display device comprises a reflective liquid crystal display (LCD) panel. The reflective LCD panel comprises: a first substrate and a second substrate, spaced apart from each other; a liquid crystal layer, disposed between the first and second substrates; a common electrode layer, disposed on the side of the first substrate facing the liquid crystal layer; a scattering layer, disposed on the side of the common electrode layer facing the liquid crystal layer; a specular reflector, disposed on the side of the second substrate facing the liquid crystal layer. The light inputted through the first substrate and the common electrode layer scatters when passing through the scattering layer, and the scattered light inputs into the specular reflector through the liquid crystal layer and produces specular reflection.

Furthermore, the specular reflector is a metal layer.

Furthermore, the metal layer serves as the pixel electrode layer of the reflective LCD panel.

Furthermore, materials for the metal layer are silver or aluminum.

Furthermore, the scattering layer is a transparent film added with scattering particles.

Furthermore, materials for the transparent film are resin, polyethylene or polyvinyl chloride (PVC).

Furthermore, the reflective LCD panel further comprises a color film polarizer disposed on a side of the first substrate opposite to the liquid crystal layer.

Furthermore, the first substrate is a color filter array substrate, and the second substrate is a thin film transistor array substrate.

In contrast to prior art, the reflective LCD panel of the present invention comprises a first and second substrates spaced apart from each other, a liquid crystal layer disposed between the first and second substrates, a common electrode layer disposed on the side of the first substrate facing the liquid crystal layer, a scattering layer disposed on the side of the common electrode layer facing the liquid crystal layer, a specular reflector disposed on the side of the second substrate facing the liquid crystal layer. Through this arrangement, the light inputted from the first substrate and common electrode layer scatters when passing through the scattering layer, and produces specular reflection when it further inputted into the specular reflector through the liquid crystal layer. The present invention delivers diffuse reflection effect through the scattering layer and specular reflector, effectively lowering the production cost.

DETAILED DESCRIPTION OF PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
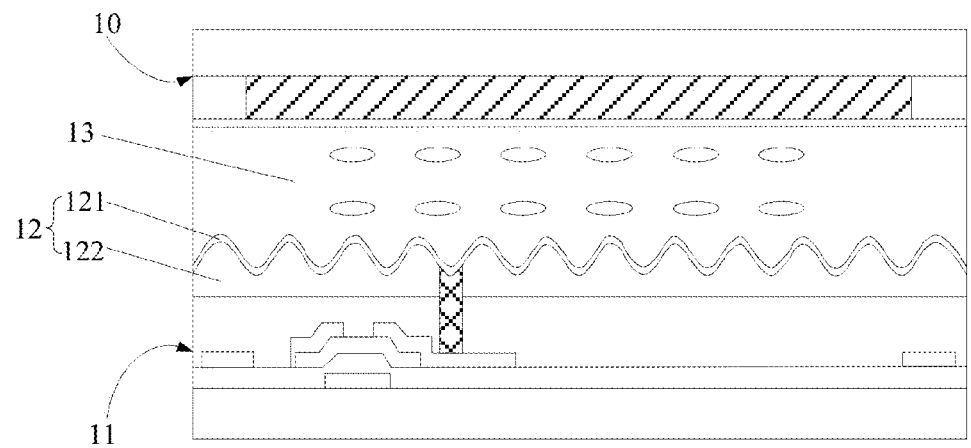
FIG. 1 is a structure diagram of a conventional reflective LCD panel.
Figure 2:
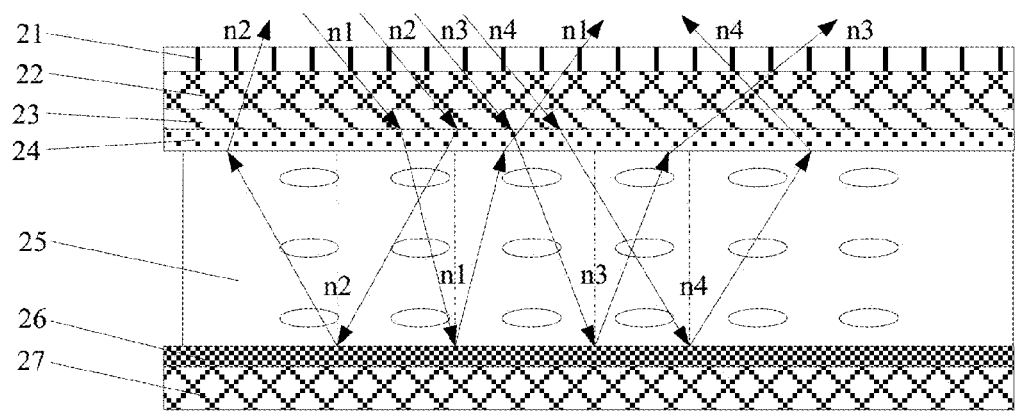
FIG. 2 is a structure diagram of the reflective LCD panel according to a preferred embodiment of the present invention.

The present invention proposes a reflective display device, comprising a reflective LCD panel. FIG. 2 is a structure diagram of the reflective LCD panel according to a preferred embodiment of the present invention. The reflective LCD panel comprises a color film polarizer 21, a first substrate 22, a common electrode layer 23, a scattering layer 24, a liquid crystal layer 25, a specular reflector 26 and a second substrate 27.

The color film polarizer 21 is disposed on the side of the first substrate 22 opposite to the liquid crystal layer 25.

The first substrate 22 and second substrate 27 are spaced apart from each other. In the present embodiment, the first substrate 22 is a color filter array substrate, and the second substrate 27 is a TFT array substrate.

The liquid crystal layer 25 is disposed between the first substrate 22 and second substrate 27.

The common electrode layer 23 is disposed on the side of the first substrate 22 facing the liquid crystal layer 25.

The scattering layer 24 is disposed on the side of the common electrode layer 23 facing the liquid crystal layer 25. In the present embodiment, the scattering layer 24 enables light to generate diffuse reflection effects. The scattering layer 24 is a transparent film added with scattering particles. More specifically, the transparent film is not conductive, and is made of resin, polyethylene, or polyvinyl chloride (PVC). Of course, in other embodiments, the scattering layer 24 can be other transparent layer of light-scattering function. It should be understood that the scattering layer 24 has a flat surface and its scattering particles can scatter the light passes through it, so to deliver a diffuse reflection effect.

The specular reflector 26 is disposed on the side of the second substrate 27 facing the liquid crystal layer 25. In other words, the liquid crystal layer 25 is disposed between the scattering layer 24 and the specular reflector 26.

In the present embodiment, light inputted through the color film polarizer 21, first substrate 22, and common electrode layer 23 scatters when passing through the scattering layer 24, then inputs into the specular reflector 26 through the liquid crystal layer 25 to produce specular reflection. It means that the specular reflector 26 has a flat surface and can reflect light.

Furthermore, the specular reflector 26 is a metal layer, serving as the pixel electrode layer of the reflective LCD panel. Therefore, the specular reflector 26 not only reflects light, but also provides electric voltage to the liquid crystal layer 25 as a pixel electrode layer. It means that in the production process, a specular reflector 26 that is reflective and serves as a pixel electrode layer can be formed with one technical step, saving production cost. Preferably, the metal layer is made of silver, brass or aluminum.

For example, lights n1, n2, n3, and n4 input through the color film polarizer 21, first substrate 22, and common electrode layer 23, and scatters for the first time when passing through the scattering layer 24. Scattered lights n1, n2, n3, and n4 inputs through the liquid crystal layer 25 into the specular reflector 26 and generate specular reflection. Reflected lights n1, n2, n3, and n4, once again, input into the scattering layer 24 and scatter for the second time. Therefore, lights n1, n2, n3, and n4 scatter and reflect several times between the scattering layer 24 and specular reflector 26, and can go further to deliver an effect of even light.

In conclusion, the reflective LCD panel of the present invention comprises a first and second substrates spaced apart from each other, a liquid crystal layer disposed between the first and second substrates, a common electrode layer disposed on the side of the first substrate facing the liquid crystal layer, a scattering layer disposed on the side of the common electrode layer facing the liquid crystal layer, a specular reflector disposed on the side of the second substrate facing the liquid crystal layer. Through this arrangement, the light inputted from the first substrate and common electrode layer scatters when passing through the scattering layer, and produces specular reflection when it further inputted into the specular reflector through the liquid crystal layer. The present invention delivers diffuse reflection effect through the scattering layer and specular reflector, effectively lowering the production cost.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A reflective liquid crystal display (LCD) panel, comprising:
    a first substrate and a second substrate, spaced apart from each other;
    a liquid crystal layer, disposed between the first and second substrates;
    a common electrode layer, disposed on the side of the first substrate facing the liquid crystal layer;

a scattering layer, being a transparent film added with scattering particles and disposed on the side of the common electrode layer facing the liquid crystal layer;

a specular reflector, being a metal layer and disposed on the side of the second substrate facing the liquid crystal layer;

wherein the light inputted through the first substrate and the common electrode layer scatters when passing through the scattering layer, and the scattered light inputs into the specular reflector through the liquid crystal layer and produces specular reflection.

2. The reflective LCD panel of claim 1, wherein the metal layer serves as the pixel electrode layer of the reflective LCD panel.

3. The reflective LCD panel of claim 1, wherein materials for the metal layer are silver or aluminum.

4. The reflective LCD panel of claim 1, wherein materials for the transparent film are resin, polyethylene or polyvinyl chloride (PVC).

5. A reflective liquid crystal display (LCD) panel, comprising:
    a first substrate and a second substrate, spaced apart from each other;
    a liquid crystal layer, disposed between the first and second substrates;
    a common electrode layer, disposed on the side of the first substrate facing the liquid crystal layer;
    a scattering layer, disposed on the side of the common electrode layer facing the liquid crystal layer;
    a specular reflector, disposed on the side of the second substrate facing the liquid crystal layer;
    wherein the light inputted through the first substrate and the common electrode layer scatters when passing through the scattering layer, and the scattered light inputs into the specular reflector through the liquid crystal layer and produces specular reflection.

6. The reflective LCD panel of claim 5, wherein the specular reflector is a metal layer.

7. The reflective LCD panel of claim 6, wherein the metal layer serves as the pixel electrode layer of the reflective LCD panel.

8. The reflective LCD panel of claim 6, wherein materials for the metal layer are silver or aluminum.

9. The reflective LCD panel of claim 5, wherein the scattering layer is a transparent film added with scattering particles.

10. The reflective LCD panel of claim 9, wherein materials for the transparent film are resin, polyethylene or polyvinyl chloride (PVC).

11. The reflective LCD panel of claim 5 further comprising a color film polarizer disposed on a side of the first substrate opposite to the liquid crystal layer.

12. The reflective LCD panel of claim 5, wherein the first substrate is a color filter array substrate, and the second substrate is a thin film transistor array substrate.

13. A display device, comprising a reflective liquid crystal display (LCD) panel, the reflective LCD panel comprising:
    a first substrate and a second substrate, spaced apart from each other;
    a liquid crystal layer, disposed between the first and second substrates;
    a common electrode layer, disposed on the side of the first substrate facing the liquid crystal layer;
    a scattering layer, disposed on the side of the common electrode layer facing the liquid crystal layer;
    a specular reflector, disposed on the side of the second substrate facing the liquid crystal layer;
    wherein the light inputted through the first substrate and the common electrode layer scatters when passing through the scattering layer, and the scattered light inputs into the specular reflector through the liquid crystal layer and produces specular reflection.

14. The display device of claim 13, wherein the specular reflector is a metal layer.

15. The display device of claim 14, wherein the metal layer serves as the pixel electrode layer of the reflective LCD panel.

16. The display device of claim 14, wherein materials for the metal layer are silver or aluminum.

17. The display device of claim 13, wherein the scattering layer is a transparent film added with scattering particles.

18. The display device of claim 17, wherein materials for the transparent film are resin, polyethylene or polyvinyl chloride (PVC).

19. The display device of claim 13 wherein the reflective LCD panel further comprises a color film polarizer disposed on a side of the first substrate opposite to the liquid crystal layer.

20. The display device of claim 13, wherein the first substrate is a color filter array substrate, and the second substrate is a thin film transistor array substrate.

* * * * *